US010635195B2

(12) United States Patent
Bostick et al.

(10) Patent No.: US 10,635,195 B2
(45) Date of Patent: Apr. 28, 2020

(54) CONTROLLING DISPLAYED CONTENT USING STYLUS ROTATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 373 days.

(21) Appl. No.: 15/444,632

(22) Filed: Feb. 28, 2017

(65) Prior Publication Data
US 2018/0246588 A1    Aug. 30, 2018

(51) Int. Cl.
| | |
|---|---|
| *G06F 3/0354* | (2013.01) |
| *G06F 3/0482* | (2013.01) |
| *G06F 3/0346* | (2013.01) |
| *G06F 21/60* | (2013.01) |
| *G06K 9/22* | (2006.01) |
| *G06F 3/0362* | (2013.01) |
| *G06F 21/31* | (2013.01) |

(Continued)

(52) U.S. Cl.
CPC ........ *G06F 3/03545* (2013.01); *G06F 3/0346* (2013.01); *G06F 3/0362* (2013.01); *G06F 3/0482* (2013.01); *G06F 16/904* (2019.01); *G06F 21/31* (2013.01); *G06F 21/604* (2013.01); *G06K 9/22* (2013.01); *G06K 9/00087* (2013.01)

(58) Field of Classification Search
CPC .................................................. G06F 3/03545
See application file for complete search history.

(56) References Cited

U.S. PATENT DOCUMENTS

| | | | | | |
|---|---|---|---|---|---|
| 5,210,405 | A | * | 5/1993 | Toyoda | G06F 3/0312 250/221 |
| 5,913,629 | A | * | 6/1999 | Hazzard | B43K 5/005 178/19.01 |

(Continued)

FOREIGN PATENT DOCUMENTS

WO    2014142911    9/2014

OTHER PUBLICATIONS

Ken Hinckley et al.; "Sensing Techniques for Tablet+Stylus Interaction"; UIST'14, Oct. 5-8, 2014, Honolulu, HI, USA; ACM 978-1-4503-3069-5/14/10; http://dx.doi.org/10.1145/2642918.2647379 (Year: 2014).*

*Primary Examiner* — Scott T Baderman
*Assistant Examiner* — Benjamin Smith
(74) *Attorney, Agent, or Firm* — Brian Restauro; Andrew D. Wright; Roberts Mlotkowski Safran Cole & Calderon, P.C.

(57) ABSTRACT

Systems and methods for controlling displayed content utilizing stylus rotation are disclosed. In embodiments, a method comprises: displaying, by a computing device, a first portion of user selected content; detecting, by the computing device, rotation of a stylus; and displaying, by the computing device, a second portion of the user selected content based on the rotation of the stylus and user access rules, wherein the second portion comprises more or less content than the first portion.

14 Claims, 4 Drawing Sheets

(51) Int. Cl.
*G06F 16/904* (2019.01)
*G06K 9/00* (2006.01)

(56) References Cited

U.S. PATENT DOCUMENTS

| | | | | |
|---|---|---|---|---|
| 6,307,956 B1* | 10/2001 | Black | G06F 3/03545 | 382/124 |
| 6,326,956 B1* | 12/2001 | Jaeger | G06F 3/0317 | 178/19.05 |
| 6,570,583 B1* | 5/2003 | Kung | G06F 1/1626 | 345/661 |
| 7,509,348 B2* | 3/2009 | Burtner | G06F 3/0482 | |
| 8,613,061 B2* | 12/2013 | Dvorak | G06F 1/1647 | 380/282 |
| 8,638,320 B2 | 1/2014 | Harley et al. | | |
| 9,007,302 B1* | 4/2015 | Bandt-Horn | G06F 3/0202 | 345/156 |
| 9,164,603 B2 | 10/2015 | Pedersen et al. | | |
| 9,195,391 B2 | 11/2015 | Pisters et al. | | |
| 9,201,520 B2* | 12/2015 | Benko | G06F 3/03545 | |
| 9,218,071 B2* | 12/2015 | Westhues | G06F 3/03545 | |
| 9,280,219 B2 | 3/2016 | Idzik et al. | | |
| 9,389,701 B2* | 7/2016 | Bakken | G06F 3/033 | |
| 9,400,570 B2* | 7/2016 | Chang | G06F 3/0383 | |
| 9,430,052 B2* | 8/2016 | Hong | G06F 3/0227 | |
| 9,436,369 B2* | 9/2016 | Swanson | G06F 3/04845 | |
| 9,575,573 B2* | 2/2017 | Chang | G06F 3/03545 | |
| 9,582,117 B2* | 2/2017 | Wyrwas | G06F 3/0421 | |
| 9,594,493 B2* | 3/2017 | Otero Diaz | G06F 3/0482 | |
| 9,600,053 B2* | 3/2017 | Hicks | G06F 1/3215 | |
| 9,626,008 B2* | 4/2017 | Brewer | G06F 3/03545 | |
| 9,632,594 B2* | 4/2017 | Hicks | G06F 3/03545 | |
| 9,665,206 B1* | 5/2017 | Missig | G06F 3/0416 | |
| 9,716,825 B1* | 7/2017 | Manzari | H04N 5/232125 | |
| 9,829,987 B2* | 11/2017 | Bandt-Horn | G06F 3/0202 | |
| 9,870,083 B2* | 1/2018 | Hinckley | G06F 3/04883 | |
| 9,875,023 B2* | 1/2018 | Brown | G06F 3/04886 | |
| 9,990,117 B2* | 6/2018 | Cook | G06F 3/04842 | |
| 10,007,362 B2* | 6/2018 | Kim | G06F 3/03545 | |
| 10,114,964 B2* | 10/2018 | Ramesh | G06F 21/6218 | |
| 10,324,544 B2* | 6/2019 | Miyazawa | G06F 3/04883 | |
| 2002/0060670 A1* | 5/2002 | Jaeger | G06F 3/0317 | 345/173 |
| 2008/0030486 A1* | 2/2008 | Cook | G06F 3/03545 | 345/179 |
| 2008/0059913 A1* | 3/2008 | Burtner | G06F 3/0482 | 715/854 |
| 2010/0020103 A1* | 1/2010 | Ure | G06F 1/1624 | 345/660 |
| 2010/0313239 A1* | 12/2010 | Chakra | G06F 21/6218 | 726/2 |
| 2010/0333215 A1* | 12/2010 | Wang | G06F 1/1626 | 726/34 |
| 2011/0095993 A1* | 4/2011 | Zuverink | G06F 3/04847 | 345/173 |
| 2011/0291998 A1* | 12/2011 | Adams | G06F 3/03545 | 345/179 |
| 2011/0297457 A1* | 12/2011 | Yeh | G06F 3/03545 | 178/19.01 |
| 2011/0304577 A1* | 12/2011 | Brown | G06F 3/03545 | 345/174 |
| 2012/0054822 A1* | 3/2012 | Dvorak | G06F 1/1647 | 726/1 |
| 2012/0127110 A1* | 5/2012 | Amm | G06F 3/03545 | 345/174 |
| 2012/0162214 A1 | 6/2012 | Chavez et al. | | |
| 2012/0229427 A1* | 9/2012 | Li | G06F 3/03545 | 345/179 |
| 2012/0242603 A1 | 9/2012 | Engelhardt et al. | | |
| 2013/0106724 A1* | 5/2013 | Pedersen | G06F 3/0346 | 345/173 |
| 2013/0106725 A1* | 5/2013 | Bakken | G06F 3/033 | 345/173 |
| 2013/0127911 A1* | 5/2013 | Brown | G06F 3/04886 | 345/649 |
| 2013/0145322 A1* | 6/2013 | Hendricks | G06F 3/04817 | 715/834 |
| 2013/0207937 A1* | 8/2013 | Lutian | G06F 3/042 | 345/175 |
| 2013/0212703 A1* | 8/2013 | Ramesh | G06F 21/6218 | 726/28 |
| 2013/0257777 A1* | 10/2013 | Benko | G06F 3/03545 | 345/173 |
| 2013/0278550 A1* | 10/2013 | Westhues | G06F 3/03545 | 345/174 |
| 2014/0022218 A1* | 1/2014 | Parekh | G06F 3/038 | 345/179 |
| 2014/0035886 A1* | 2/2014 | Idzik | G06F 3/01 | 345/179 |
| 2014/0071098 A1* | 3/2014 | You | G06F 3/0487 | 345/179 |
| 2014/0180481 A1* | 6/2014 | Park | G06F 3/0487 | 700/275 |
| 2014/0210797 A1* | 7/2014 | Kreek | G06F 3/0488 | 345/179 |
| 2014/0218343 A1* | 8/2014 | Hicks | G06F 3/04883 | 345/179 |
| 2014/0218383 A1 | 8/2014 | Srivastava | | |
| 2014/0253461 A1* | 9/2014 | Hicks | G06F 1/3215 | 345/173 |
| 2014/0253464 A1* | 9/2014 | Hicks | G06F 3/03545 | 345/173 |
| 2014/0253465 A1* | 9/2014 | Hicks | G06F 3/03545 | 345/173 |
| 2014/0253467 A1* | 9/2014 | Hicks | G06F 3/033 | 345/173 |
| 2014/0253469 A1* | 9/2014 | Hicks | G06F 3/03545 | 345/173 |
| 2014/0253470 A1* | 9/2014 | Havilio | G06F 3/0412 | 345/173 |
| 2014/0253520 A1* | 9/2014 | Cueto | G06F 3/0383 | 345/179 |
| 2014/0253521 A1* | 9/2014 | Hicks | G06F 3/03545 | 345/179 |
| 2014/0253522 A1* | 9/2014 | Cueto | G06F 3/03545 | 345/179 |
| 2014/0304834 A1* | 10/2014 | Hulse | G06F 21/36 | 726/28 |
| 2014/0313171 A1* | 10/2014 | Hong | G06F 3/0227 | 345/184 |
| 2014/0359508 A1* | 12/2014 | Otero Diaz | G06F 3/0482 | 715/771 |
| 2014/0362024 A1* | 12/2014 | Hicks | G06F 3/167 | 345/174 |
| 2015/0054783 A1 | 2/2015 | Curtis | | |
| 2015/0058801 A1* | 2/2015 | John | G06F 3/04847 | 715/801 |
| 2015/0205367 A1* | 7/2015 | Bandt-Horn | G06F 3/0202 | 345/156 |
| 2015/0220169 A1* | 8/2015 | Keating | G06F 3/017 | 345/179 |
| 2015/0309577 A1* | 10/2015 | You | G06F 3/0487 | 345/179 |
| 2015/0309662 A1* | 10/2015 | Wyrwas | G06F 3/0421 | 345/175 |
| 2015/0346886 A1* | 12/2015 | Motoi | G06K 9/224 | 345/174 |
| 2015/0363034 A1* | 12/2015 | Hinckley | G06F 3/04883 | 345/173 |
| 2016/0054821 A1* | 2/2016 | Kim | G06F 3/03545 | 345/179 |
| 2016/0092080 A1* | 3/2016 | Swanson | G06F 3/04845 | 345/654 |
| 2016/0139690 A1* | 5/2016 | Chang | G06F 3/0383 | 345/179 |
| 2016/0179222 A1* | 6/2016 | Chang | G06F 3/03545 | 345/179 |
| 2017/0038947 A1* | 2/2017 | Cook | G06F 3/04842 | |
| 2017/0228121 A1* | 8/2017 | Wosk | G06F 3/0487 | |

(56) References Cited

U.S. PATENT DOCUMENTS

| | | | |
|---|---|---|---|
| 2017/0242502 A1* | 8/2017 | Gray | G06F 3/0383 |
| 2017/0262089 A1* | 9/2017 | Missig | G06F 3/041 |
| 2017/0269810 A1* | 9/2017 | Kanda | G06F 3/03545 |
| 2017/0315793 A1* | 11/2017 | Kanematsu | G06F 8/61 |
| 2017/0339370 A1* | 11/2017 | Inoue | G06F 3/0488 |
| 2017/0359504 A1* | 12/2017 | Manzari | H04N 5/23216 |
| 2018/0074639 A1* | 3/2018 | Powell | G06F 3/044 |
| 2018/0196574 A1* | 7/2018 | Case, Jr. | G06F 3/0418 |
| 2018/0260044 A1* | 9/2018 | Touyama | G06F 3/03545 |

* cited by examiner

CONTROLLING DISPLAYED CONTENT USING STYLUS ROTATION

BACKGROUND

The present invention relates generally to controlling displayed content and, more particularly, to controlling displayed content using stylus rotation.

Computing devices (e.g., mobile computers, tablets, smartphones, etc.) may be equipped with various security authentication methods or apparatuses (e.g., passwords, biometrics, etc.) for limiting a user's access to certain content. Moreover, computing devices may be utilized in conjunction with user interface tools, such as electronic styluses, computer mice, voice recognition software, etc.

SUMMARY

In an aspect of the invention, a computer-implemented method includes: displaying, by a computing device, a first portion of user selected content; detecting, by the computing device, rotation of a stylus; and displaying, by the computing device, a second portion of the user selected content based on the rotation of the stylus and user access rules, wherein the second portion comprises more or less content than the first portion.

In another aspect of the invention, there is a computer program product for controlling displayed content utilizing stylus rotation. The computer program product comprises a computer readable storage medium having program instructions embodied therewith. The program instructions are executable by a computing device to cause the computing device to: display a first level of content; detect that a stylus has rotated one of clockwise or counterclockwise; and display a second level of the content based on the detected clockwise or counterclockwise rotation of the stylus and user access rules, wherein the second level of the content comprises more or less content than the first level of content.

In another aspect of the invention, there is a system for controlling displayed content utilizing stylus rotation. The system includes a CPU, a computer readable memory and a computer readable storage medium associated with a computing device. The system further includes program instructions to detect an active user; program instructions to display a first portion of content; program instructions to detect rotation of a stylus; and program instructions to display a second portion of the content based on the rotation of the stylus and user access rules associated with the active user, wherein the second portion of the content comprises more or less content than the first portion of content, and wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to controlling displayed content and, more particularly, to controlling displayed content using stylus rotation. In embodiments, a method is provided for changing content levels displayed on a touch device through rotation of a stylus (e.g., digital pen, electronic pen, etc.). In aspects, a system detects the rotation of a stylus including an accelerometer or gyroscope, and communicates (e.g., via Bluetooth or the like) rotation of the stylus to a user computer device (e.g., mobile computing device) which effects a change in the content level displayed (e.g., the amount of content displayed) by the user computer device. In one example, clockwise rotation of the stylus tightens or restricts content levels, while counter clockwise rotation of the stylus loosens or broadens content levels. Embodiments of the invention control levels of content displayed including: levels of confidentiality and security; levels of complexity; levels of age appropriateness; and levels of detail in search results. In embodiments, a system utilizes a finger print reader located on the stylus to authenticate a user for identification purposes (e.g., confidentiality level, complexity, age, etc.), and then determines from a user's profile which level of content the user is authorized to see using the rotation of the stylus in clockwise and/or counterclockwise rotation modes. In aspects, a method is provided for sharing different portions of content (e.g., content at different levels) based on the rotation position of the stylus and following control actions to initiate sharing of the content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
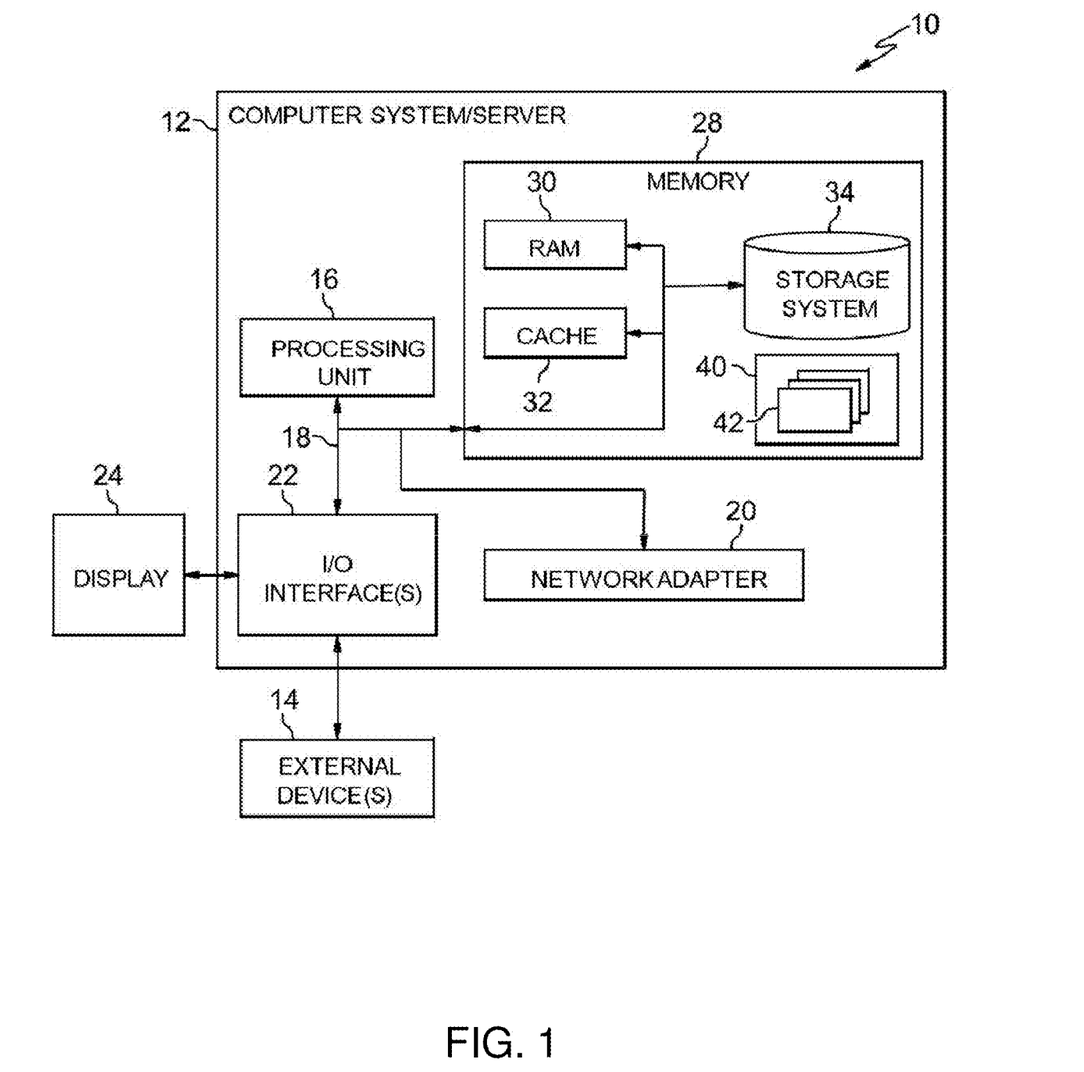
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
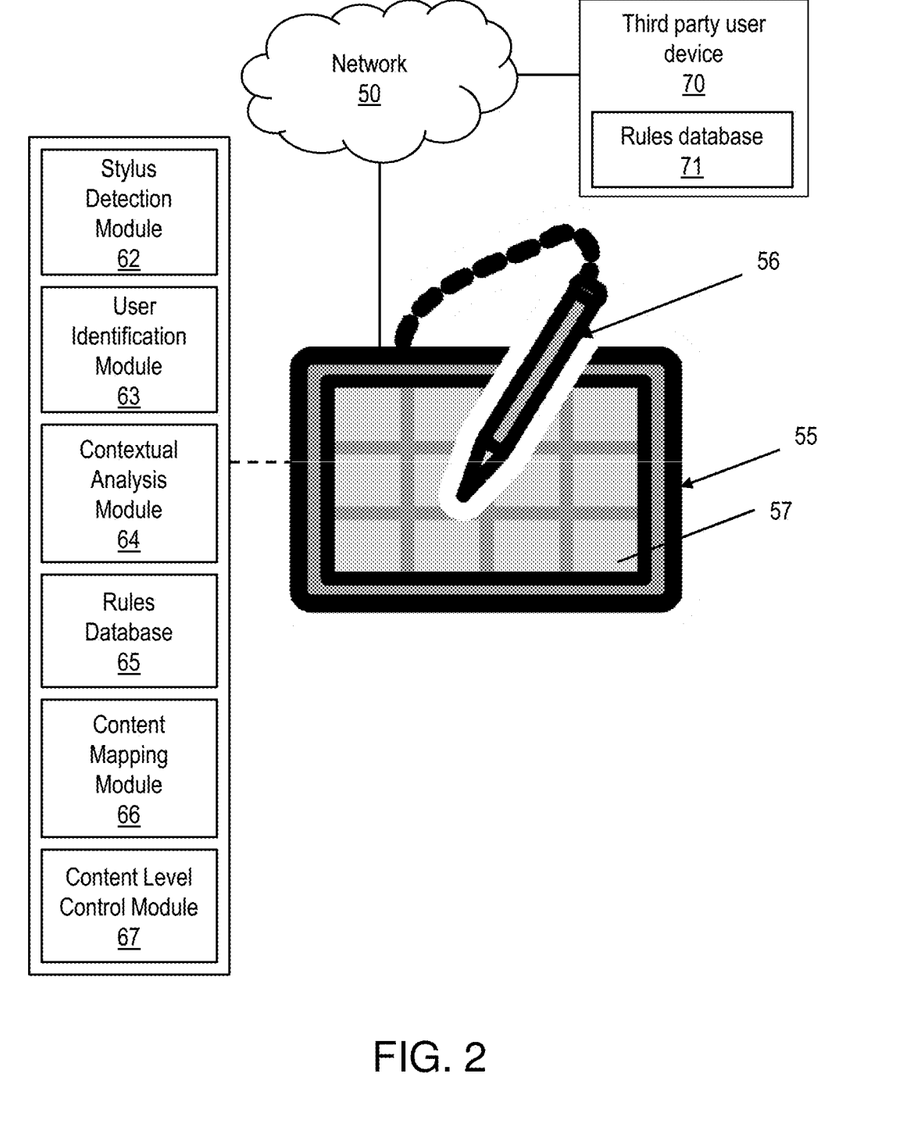
FIG. 2 shows an exemplary environment in accordance with aspects of the invention.

FIG. 2 shows an exemplary environment in accordance with aspects of the invention. The environment includes a user computer device 55 in communication with an electronic pen or stylus (hereafter stylus) 56. The user computer device 55 may communicate with the stylus 56 using conventional pairing methods, such as Bluetooth pairing. The user computer device 55 may comprise a computer system 12 of FIG. 1, and may be connected to a network 50 via the network adapter 20 of FIG. 1. In aspects, the user computer device 55 includes a display in the form of a touchscreen 57. The user computer device 55 may be a general purpose computing device, such as a desktop computer, laptop computer, tablet computer, smartphone, etc.

Still referring to FIG. 2, the user computer device 55 may include a stylus detection module 62, a user identification module 63, a contextual analysis module 64, a rules database 65, a content mapping module 66 and a content level control module 67. The stylus detection module 62, user identification module 63, contextual analysis module 64, content mapping module 66 and content level control module 67 may include one or more program modules (e.g., program module 42 of FIG. 1) executed by the user computer device 55, and may be configured to perform one or more of the functions described herein.

In embodiments, the stylus detection module 62 is configured to detect actions of the stylus 56, such as rotation of the stylus 56. In aspects, the user identification module 63 is configured to identify an active user of the stylus 56 and/or user computer device 55. In embodiments, the contextual analysis module 64 is configured to determine the content type of user selected content.

In embodiments, user access rules that associate a user with various levels of access to one or more content types and/or subcategories of the content types are stored in the rules database 65. In aspects, the content mapping module 66 is configured to map content levels (access levels) for the selected content to user access rules in the rules database 65. In embodiments, the content level control module 67 adjusts the portions of content or levels of content displayed by the user computer device 55 based on detected rotation of the stylus 56 and user access rules. The user computer device 55 may include additional or fewer components and modules than those shown in FIG. 2. In embodiments, separate modules may be integrated into a single computing component or module. Additionally, or alternatively, a single module integrated into multiple computing components or modules.

The network 50 may be any suitable communication network or combination of networks, such as a local area network (LAN), a general wide area network (WAN), and/or a public network (e.g., the Internet). In embodiments, the user computer device 55 is in communication with one or more third party user devices 70 through the network 50. In aspects, one or more of the third party user devices 70 includes a rules database 71 for storing user access rules that associate the third party user with various levels of access to one or more content types and/or subcategories of the content types. In embodiments, the third party user device 70 comprises the same components as the user computer device 55, and can be utilized by the third party user in accordance with methods shown in FIG. 4.

Figure 3:
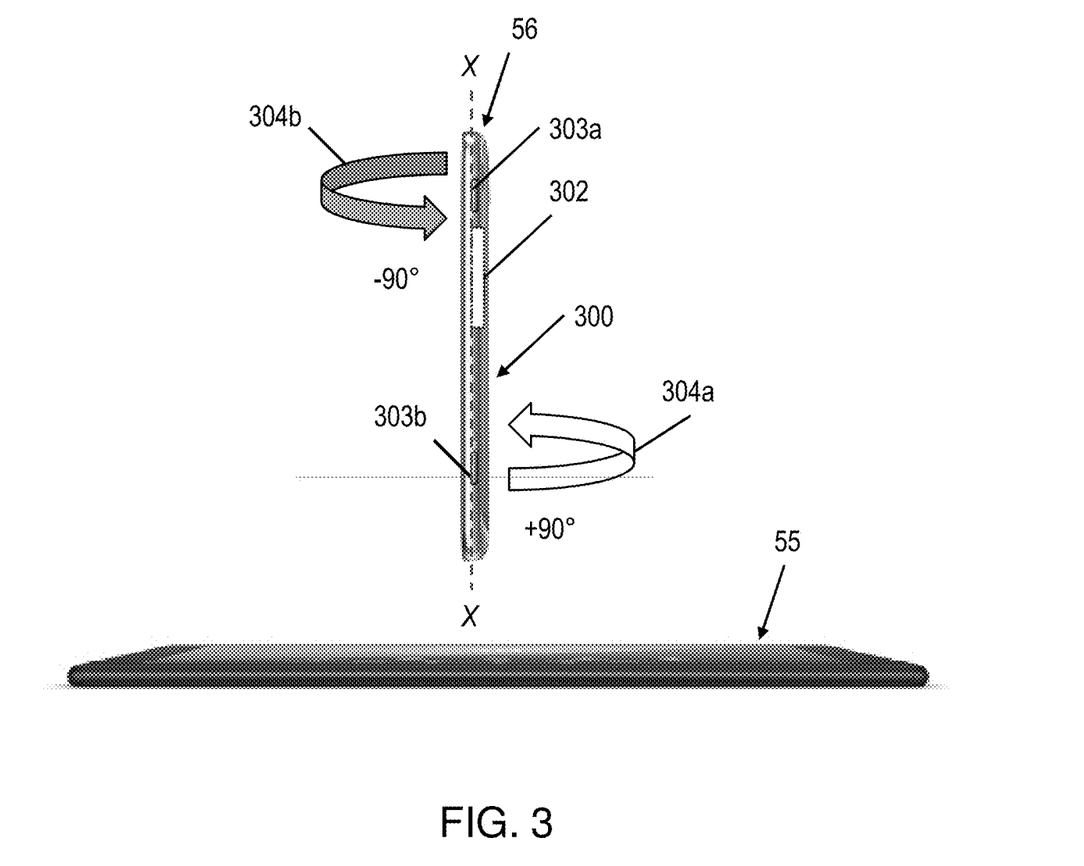
FIG. 3 depicts a stylus and user computer device in accordance with embodiments of the invention.

FIG. 3 depicts a stylus 56 and user computer device 55 in accordance with embodiments of the invention. As depicted in FIG. 3, the stylus 56 may include a body 300 having a longitudinal axis X. The stylus 56 may incorporate one of multiple available devices for determining clockwise 304a or counterclockwise 304b rotation of the stylus 56 about the axis X. By way of example, an accelerometer and/or gyroscope (not shown) may be incorporated within the body 300. In embodiments, a fingerprint detector indicated at 302 is incorporated into the body 300 of the stylus 56 and may be utilized to authenticate a user in accordance with methods of FIG. 4. In aspects, the stylus 56 includes one or more buttons or actuators 303a, 303b for performing one or more functions.

In embodiments, an active user of the stylus 56 (a user actively utilizing the stylus 56) can utilize the stylus 56 to tighten or restrict content viewed on the user computer device 55 by rotating the stylus 56 clockwise 304a or counterclockwise 304b. In embodiments, the stylus 56 may be utilized to control the level of content displayed for confidentiality or security, complexity, and age appropriateness through clockwise rotation to tighten or restrict the content level viewed, or counterclockwise rotation to loosen or broaden the content level viewed. Conversely, in embodiments, the stylus 56 may be utilized to control the level of content displayed through counterclockwise rotation to tighten or restrict the content level viewed, or clockwise rotation to loosen or broaden the content level viewed. Additional details regarding the content level control are discussed below with respect to FIG. 4.

Figure 4:
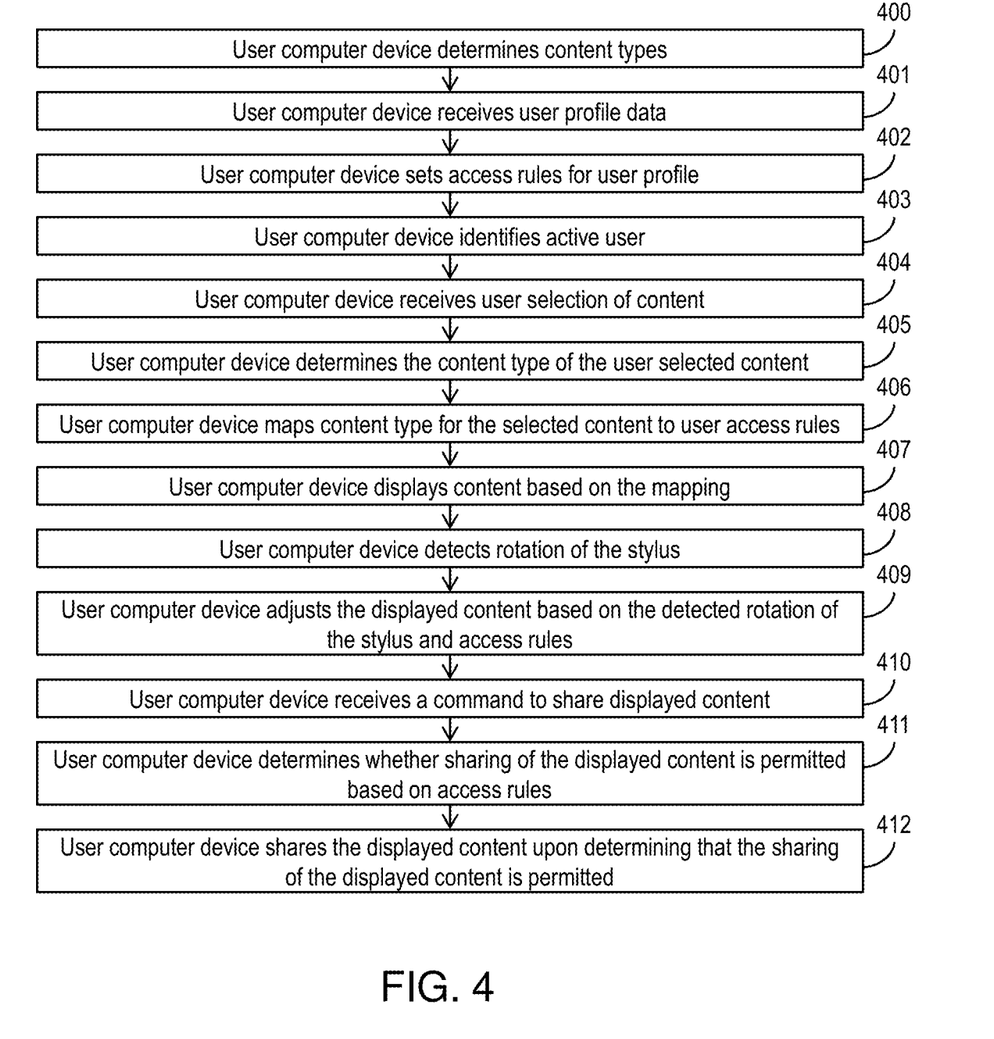
FIG. 4 shows a flowchart of steps of a method in accordance with aspects of the invention.

FIG. 4 shows a flowchart of a method in accordance with aspects of the invention. Steps of the method of FIG. 4 may be performed in the environment illustrated in FIG. 2, and are described with reference to elements shown in FIGS. 2 and 3.

At step 400, the user computer device 55 determines content types (e.g., categories of content) and associated levels of access or subcategories. Content types may be determined based on the type of control required by the user computer device 55. For example, the user computer device 55 may be configured to control one or more of: levels of confidentiality and security, levels of complexity, levels of age appropriateness, and levels of detail in search results. In embodiments, the user computer device 55 determines content types through learning based on external realtime data sources, such as social network feedback.

In certain situations, such as when working with content in a public space, there may be a need to control the confidentiality or security level of content being displayed by the user computer device 55. In such a situation, the content type determined by the user computer device 55 may include subcategories (security levels) such as "unclassified", "official", "restricted", "confidential", "secret", and "top secret", wherein unclassified content may be viewed any time, and access to the remaining subcategories is progressively more restricted.

In circumstances, there may be different levels of detail or complexity for content. For example, for a beginner, a sentence or paragraph providing a history on a topic may be sufficient, whereas an expert level may comprise many pages or chapters of detailed content. In this situation, the content types determined by the user computer device 55 may include the subcategories of "beginner", "intermediate", "advanced" and "expert", for example.

In circumstances, there may be different levels of age appropriateness for content (e.g., movies, gaming, education, etc.). For example, the content type category may be "movie" and the subcategories may comprise rating levels of G, PG, PG-13, etc. In circumstances, when performing a search, a user may wish to have different levels of search result detail displayed. In this situation, the content types determined by the user computer device 55 may include the category of "search" and the subcategories may comprise "minimum level of detail", "medium level of detail", and "high level of detail", for example. For example, if a user is searching movies, content levels may comprise: movie titles (minimum level of detail); movie titles and synopses (medium level of detail); and titles, synopses and lead actors (high level of detail).

In step 401, the user computer device 55 receives user profile data. For example, a user may enter user profile data utilizing an external device 14, such as a keyboard, or by utilizing the touchscreen 57. User profile data may include any data that enables the user computer device 55 to provide customized control of displayed content based on content types determined at step 400. For example, user profile data may include the age of a user, which may be utilized to determine the user's access to content levels based on the age appropriateness of each content level.

In step 402, the user computer device 55 sets access rules for each user profile established at step 401, to establish a user's access to each content type established at step 400. Access rules of step 402 may be set based on the manual entry of rules by an administrator, or may be set automatically based on predetermined parameters. For example, an administrator may be the guardian of a user, and the guardian may manually set access rules for the user such that the user cannot access any movie (content type category) having a rating (subcategory) that is not G, or PG. In another example, predetermined parameters stored in the rules database 65 (e.g., <13 years of age has access to only G or PG rated movies, 13+ years has access to G, PG or PG-13 rated movies, etc.) may cause the user computer device 55 to automatically establish an access rule for a user that limits the content type accessible by the user based on user profile data (e.g., age of user). In embodiments, access rules established at step 402 are stored in the rules database 65. The user access rules may include default rules for the initial displaying of a content type. For example, a user may set an access rule for the category "search" to initially display content at a "minimum level of detail", rather than at a "medium level of detail", or a "high level of detail".

At step 403, the user computer device 55 identifies an active user of the user computer device 55 or stylus 56. In aspects, the user identification module 63 identifies the active user based on identification information received (e.g., password, fingerprint scan, etc.) and associated user profile data stored in the user computer device 55. A number of different identification methods could be utilized with step 403. For example, an active user may manually identify themselves to the user computer device 55 by logging into the user computer device 55, and the user computer device 55 may recognize that the login information entered by the user is associated with user profile data of a particular user. In another example, the fingerprint detector 302 may be utilized to identify and/or authenticate an active user of the stylus 56. In yet another example, a fingerprint detector incorporated into the touchscreen 57 may be utilized to identify an active user of the user computer device 55.

At step 404, the user computer device 55 receives a user's selection of content to display. For example, a user may enter search terms in a search window of a browser displayed on the touchscreen 57 of the user computer device 55. In another example, a user accesses a list of movies available for streaming through the network 50.

In step 405, the user computer device 55 determines the content type of the user's selection of content. In embodiments, the contextual analysis module 64 performs contextual analysis of the user's selection of content to determine the content type. The user's selection of content may be content that is already displayed to a user through the user computer device 55, or may be content that is being retrieved by a user through the user computer device 55. By way of example, the contextual analysis module 64 may perform text recognition methods for content shown on the touchscreen 57 of the user computer device 55, and may determine that the displayed content comprises a list of movies available for streaming through the network 50. In this scenario, the user computer device 55 recognizes that the displayed content is of the content type "movie" and that the displayed content is associated with the subcategories "rated G movies", "rated PG movies", "rated PG-13 movies", etc. In another example, the contextual analysis module 64 may recognize when a user is typing a search into a browser window and may automatically identify the selected content as being of the content type "search". In another example, the contextual analysis module 64 may recognize that the user is typing a search into a browser window or is clicking on a link to access certain information, and may automatically identify the content that the user is trying to access using text recognition of the search terms entered in the browser window or text recognition of the link clicked on by the user. In embodiments, the contextual analysis module 64 determines the content type of the selected content utilizing meta data of the content prior to opening the content. In aspects, the use computer device 55 opens the selected content and thereafter performs contextual analysis of the content to determine its type. It should be understood that step 405 could be performed utilizing a number of different methods for context recognition, and the present invention is not intended to be limited by the examples herein.

At step 406, the user computer device 55 maps content type for the user selected content to user access rules. In embodiments, the content mapping module 66 of the user computer device 55 maps content type including subcategories (levels of access) for the selected content to user access rules stored in the rules database 65. In embodiment, the subcategories comprise different portions of the selected content. For example, the user computer device 55 may recognize at step 405 that a user is attempting to access the content type "movies", and that the user access rules in the rules database 65 limit the user's access to subcategories of movies including "rated G movies", "rated PG movies", "rated PG-13 movies". Thus, the user has access to only a portion of the total available selected content. In another example, the user computer device 55 may recognize at step 405 that the user is attempting to perform a search, and may map the content type "search" to user access rules that cause the user computer device 55 to initially display search results at a minimum level of detail.

At step 407, the user computer device 55 displays content to the user based on the mapping of step 406. In embodiments, the content level control module 67 causes the computer device 55 to initially display user selected content based on the user access rules stored in the rules database 65. For example, the user computer device 55 may determine at step 406 that the content type "search" should initially be displayed at a minimum level of detail for a particular user (rather than a "medium level of detail" or a "high level of detail"). In another example, the user computer device 55 may determine at step 406 that the content type "movie" should initially be displayed based on the subcategories of movie ratings, and should start by initially displaying only G-rated movies.

At step 408, the user computer device 55 detects rotation of the stylus 56 clockwise 304a or counterclockwise 304b about its longitudinal axis X. In embodiments, the stylus detection module 62 detects the rotation of the stylus 56 only when the stylus 56 is in contact with the touchscreen 57. In embodiments, the user computer device 55 detects the rotation of the stylus 56 within a predetermined time period after the stylus 56 contacts the touchscreen 57. In embodiments, the user computer device detects the rotation of the stylus 56 after detecting initiation of the stylus 56, such as through the user pushing on one of buttons 303a or 303b. In embodiments, as the user rotates the stylus 56, an overlay of the content type (e.g., search) and content level (e.g., minimum level of detail, medium level of detail or high level of detail) is displayed on the display 24 of the user computer device 55 for the user to visualize. The user computer device 55 can detect the rotation of the stylus 56 utilizing one of multiple detection methods, including the use of Bluetooth communications between the user computer device 55 and a gyroscope apparatus (not shown) of the stylus 56.

In embodiments, the user computer device 55 detects the rotation of the stylus 56 through one or more "clicks", wherein a "click" is defined by a predetermined amount of rotation of the stylus 56 about its longitudinal axis from an initial starting point. For example, the stylus detection module 62 may determine that the stylus 56 has been rotated 90 degrees in a clockwise direction 304a from an initial starting point, and has thus rotated one "click". The stylus detection module 62 may likewise determine that the stylus 56 has rotated −90 degrees in a counterclockwise direction 304b from the last "click", and has therefore rotated one "click" in the opposite direction. Although examples herein refer to a rotation of 90 degrees, it should be understood that any amount of rotation (e.g., 45 degrees, 180 degrees, 360 degrees) could be utilized to determine a "click" in accordance with embodiments of the invention. The initial starting point for determining a "click" may be defined as the position of the stylus 56 when it first contacts the touchscreen 57, or the position of the stylus 56 when the user actuates one of the buttons 303a, 303b. Alternatively, the initial starting point may be a current position of the stylus 56 (without contacting the touchscreen 57 or actuation of one of the buttons 303a, 303b) when the stylus 56 begins to be rotated by a user.

At step 409, the user computer device 55 adjusts the displayed content based on the rotation of the stylus 56 detected at step 408 (e.g., clicks detected) and the user's access rules stored in the rules database 65. In aspects, the user computer device 55 adjusts the displayed content to display a different portion of the content than was initially displayed (more or less content than was originally displayed), based on the rotation of the stylus 56 and user access rules. Depending on the active user identified at step 403, the user computer device 55 may recognize different possible mapping of content levels appropriate for the active user, and thus there may be different rotation options available for the active user (e.g., one click available, two clicks available, etc.).

In embodiments, the content level control module 67 adjusts the displayed content based on stylus rotation information determined by the stylus detection module 62 and the user's access rules. For example, the content level control module 67 may determine that the user has rotated the stylus 56 one "click" in the counterclockwise direction 304b, thereby indicating that the user wishes to expand the information viewed on the touchscreen 57 to include additional subcategories or portions of content. In another example, the content level control module 67 may determine that the user has rotated the stylus 56 one "click" in the clockwise direction 304b, thereby indicating that the user wishes to narrow the information viewed on the touchscreen 57 to include less subcategories or portions of content. While described with respect to expanding information while rotating the stylus 56 counterclockwise, and narrowing information while rotating the stylus 56 clockwise, it should be understood that embodiments of the present invention could expand information by rotating the stylus 56 clockwise, and narrow information while rotating the stylus 56 counterclockwise.

In embodiments, at step 410, the user computer device 55 receives a command to share displayed content. By way of example, the user computer device 55 may receive a command to email a document to a third party user device (e.g., 70).

At step 411, the user computer device 55 determines whether sharing the displayed content with the third party device 70 is permitted based on access rules. For example, the user computer device 55 may determine that the displayed content is associated with a secure content type, and is classified under the subcategory of "secret". The user computer device 55 may then determine that the third party is not permitted to view content classified as "secret", based on user access rules in the rules database 65, or access rules obtained from the rules database 71 of the third party user device 70. In this scenario, the user computer device 55 may determine that sharing of the content is impermissible, and would prevent the sharing of the content through the user computer device 55. However, if the user computer device 55 determines that the third party is permitted to view the content based on user access rules, the user computer device 55 enables the transfer.

In embodiments, sharing of content at different content levels is performed based on the rotation position of the stylus 56 following the control action to initiate sharing of the content at step 410. For example, if the active user rotates the stylus 56 clockwise 304a while touching "confidential" content, thereby restricting the content until an "unclassified" level of the content is displayed, and then initiates a control action to share the content with a third party in accordance with step 410, the user computer device 55 may determine whether sharing of the "unclassified" level of content is permitted in accordance with step 411. In this example, the "confidential" content may be obfuscated, such that only "unclassified" content is displayed and available for sharing with the third party. 20. In embodiments, the user computer device 55 is configured to share a first portion of the displayed content as obfuscated content (e.g, confidential content) along with a second portion of the displayed content (e.g., unclassified content) which is visible to a user viewing the shared content.

At step 412, the user computer device 55 shares the displayed content upon determining that the sharing of the displayed content is permitted in accordance with step 411. For example, if the user computer device 55 determines that the third party is permitted to view the content based on user access rules, the user computer device 55 would initiate sharing of the displayed content.

Example 1: Controlling Displayed Content for Security

In a first exemplary scenario, the fingerprint detector 302 of the stylus 56 communicates an active user's fingerprint to the user computer device 55 for identification and authentication purposes in accordance with step 403 of FIG. 4. In this scenario, the active user has a user profile associated with access rules that enable the active user to view the content type "secure information" for the following subcategories "unclassified", "official", restricted", "confidential", and "secret", but not for the subcategory "top secret". The user computer device 55 receives a user selection of content when the user clicks on a link to a secure file, in accordance with step 404 of FIG. 4. The user computer device 55 determines that the content type for the secure file is "secure information" in accordance with step 405 of FIG. 4. The user computer device 55 then maps the content type "secure information" for the secure file to the active user's access rules stored in the rules database 65, in accordance with step 406 of FIG. 4. In this scenario, the user computer device 55 recognizes that the user's access rules (e.g., display default) indicate that the "secure information" should first be displayed at the narrowest or most restricted viewing level of "unclassified", and displays the "unclassified" content on the user computer device 55 in accordance with step 407 of FIG. 4. The user then touches the stylus 56 to the "unclassified" content, and proceeds to rotate the stylus in the counterclockwise direction 304b one "click" to broaden the content viewing level, and the rotation is detected by the user computer device 55 in accordance with step 408 of FIG. 4. The user computer device 55 then adjusts the displayed content to display "official" content, thereby enabling the viewing of more or broader content than the "unclassified" content, in accordance with step 409 of FIG. 4.

In this scenario, the active user touches the stylus 56 to the "official" content displayed on the user computer device 55, and rotates the stylus 56 two "clicks" in the counterclockwise direction 304b to broaden the content viewing level by two levels, and the rotation is detected by the user computer device 55 in accordance with step 408 of FIG. 4. The user computer device 55 then adjusts the displayed content to display "confidential" content, thereby enabling the viewing of broader content than the available "unclassified", "official", and "restricted" subcategories of content, in accordance with step 409 of FIG. 4. In this scenario, if the user rotates the stylus 56 another "click" in the clockwise direction 304a, the user computer device 55 will not adjust the displayed content to display the broader category of "top secret" content, since the access rules for the active user do not allow the active user to view "top secret" content.

In this exemplary scenario, the active user attempts to share the "confidential" content by attaching the "confidential" content to an email to a remote user, in accordance with step 410 of FIG. 4. The user computer device 55 determines that the active user is not permitted to send "confidential" content, based on the fact that the displayed content is categorized as "confidential" content, in accordance with step 411. The user then touches the stylus 56 to the "confidential" content displayed on the user computer device 55, and rotates the stylus 56 three "clicks" in the clockwise direction 304a to narrow the content viewing level by three levels, and the user computer device 55 then adjusts the displayed content to display "unclassified" content, in accordance with steps 408 and 409 of FIG. 4. Thereafter, steps 410 and 411 of FIG. 4 are repeated, and the user computer device 55 shares the displayed "unclassified" content with the third party user in accordance with step 412 of FIG. 4 after determining that the "unclassified" content was permissible to share.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for controlling displayed content utilizing stylus rotation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computing device, a user selection of content, wherein the user selected content comprises multiple levels of content, each level comprising a portion of the user selected content;
   displaying, by the computing device, a first portion of the user selected content associated with a first level of the user selected content;
   determining, by the computing device, a content type of the user selected content;
   identifying, by the computing device, a user based on a fingerprint received from a fingerprint detector of the stylus;
   mapping, by the computing device, the content type to user access rules of the identified user;
   detecting, by the computing device, rotation of a stylus, wherein the detecting the rotation of the stylus comprises detecting the rotation of the stylus through multiple clicks, wherein each of the multiple clicks is a predetermined amount of rotation of the stylus about its longitudinal axis from an initial starting point, and wherein each of the multiple clicks is associated with one of a plurality of levels of the user selected content, and the user access rules define which of the plurality of levels are available to the user;
   displaying, by the computing device, a second portion of the user selected content associated with a second level of the user selected content based on the rotation of the stylus and user access rules, wherein the second portion comprises more or less content than the first portion; and
   determining, by the computing device, that the second level of the user selected content is available to the user based on the user access rules prior to the displaying the second portion of the user selected content,
   wherein the content type is associated with the multiple levels of content, each of the multiple levels of content having a portion of content associated therewith, and
   wherein the multiple levels of content are selected from the group consisting of: levels of confidentiality, levels of security, levels of complexity, levels of age appropriateness, and levels of detail.

2. The method of claim 1, wherein the determining the content type comprises determining
   a plurality of content types, wherein the user selected content is associated with at least one of the plurality of content types; and
   wherein the mapping comprises mapping the at least one of the plurality of content types of the user selected content to the user access rules.

3. The method of claim 1, further comprising:
   receiving, by the computing device, user profile data; and
   setting, by the computing device, the user access rules for a user associated with the user profile data.

4. The method of claim 3, further comprising identifying, by the computing device, an active user of the stylus associated with the user profile data.

5. The method of claim 1, further comprising:
   receiving, by the computing device, a command to share the second portion of the displayed user selected content;
   determining, by the computing device, that sharing of the second portion of the displayed user selected content is permitted; and
   sharing, by the computing device, the second portion of the displayed user selected content.

6. A computer program product for controlling displayed content utilizing stylus rotation, the computer program product comprising a computer readable storage medium having program instructions embodied therewith, the program instructions executable by a computing device to cause the computing device to:
   receive a user selection of content, wherein the user selected content comprises multiple levels of content, each level comprising a portion of the user selected content;
   display a first portion of the user selected content associated with a first level of the user selected content;
   determine a content type of the user selected content;
   identify a user based on a fingerprint received from a fingerprint detector of the stylus;
   map the content type to user access rules of the identified user;
   detect rotation of a stylus, wherein the detecting the rotation of the stylus comprises detecting the rotation of the stylus through multiple clicks, wherein each of the multiple clicks is a predetermined amount of rotation of the stylus about its longitudinal axis from an initial starting point, and wherein each of the multiple clicks is associated with one of a plurality of levels of the user selected content, and the user access rules define which of the plurality of levels are available to the user;
   display a second portion of the user selected content associated with a second level of the user selected content based on the detected rotation of the stylus and user access rules, wherein the second portion of the user selected content comprises more or less content than the first portion of the user selected content; and determine that the second level of the user selected content is available to the user based on the user access rules prior to the displaying the second portion of the user selected content, wherein the content type is associated with the multiple levels of content, each of the multiple levels of content having a portion of content associated therewith, and wherein the multiple levels of content are selected from the group consisting of: levels of confidentiality, levels of security, levels of complexity, levels of age appropriateness, and levels of detail.

7. The computer program product of claim 6, wherein the determining the content type comprises determining a plurality of content types, wherein the first level of content is associated with at least one of the plurality of content types; and wherein the mapping comprises mapping the at least one of the plurality of content types of the first level of content to the user access rules.

8. The computer program product of claim 6, wherein the program instructions further cause the computing device to:
receive user profile data; and
set the user access rules for a user associated with the user profile data.

9. The computer program product of claim 6, wherein the program instructions further cause the computing device to identify an active user associated with the user profile.

10. The computer program product of claim 6, wherein the program instructions further cause the computing device to:
receive a command to share the second portion of the displayed user selected content;
determine that sharing of the second portion of the displayed user selected content is permitted; and
share the second portion of the displayed user selected content.

11. A system for controlling displayed content utilizing stylus rotation, comprising:
a CPU, a computer readable memory and a computer readable storage medium associated with a computing device;
program instructions to receive a user selection of content, wherein the user selected content comprises multiple levels of content, each level comprising a portion of the user selected content;
program instructions to display a first portion of user selected content associated with a first level of the user selected content;
program instructions to determine a content type of the user selected content;
program instructions to identify a user based on a fingerprint received from a fingerprint detector of the stylus;
program instructions to map the content type to user access rules of the identified user;
program instructions to detect rotation of a stylus, wherein the detecting the rotation of the stylus comprises detecting the rotation of the stylus through multiple clicks, wherein each of the multiple clicks is a predetermined amount of rotation of the stylus about its longitudinal axis from an initial starting point, and wherein each of the multiple clicks is associated with one of a plurality of levels of the user selected content, and the user access rules define which of the plurality of levels are available to the user;
program instructions to display a second portion of the user selected content associated with a second level of the user selected content based on the rotation of the stylus and user access rules, wherein the second portion of the user selected content comprises more or less content than the first portion of the user selected content; and
program instructions to determine that the second level of the user selected content is available to the user based on the user access rules prior to the displaying the second portion of the user selected content, wherein the content type is associated with the multiple levels of content, each of the multiple levels of content having a portion of content associated therewith, wherein the multiple levels of content are selected from the group consisting of: levels of confidentiality, levels of security, levels of complexity, levels of age appropriateness, and levels of detail, and wherein the program instructions are stored on the computer readable storage medium for execution by the CPU via the computer readable memory.

12. The system of claim 11, further comprising:
program instructions to receive user profile data for the user; and
program instructions to set the user access rules for the user.

13. The system of claim 11, further comprising:
program instructions to receive a command to share the second portion of the displayed user selected content; and
program instructions to determine if sharing of the second portion of the displayed user selected content is permitted.

14. The system of claim 13, wherein the second portion of the user selected content comprises less content than the first portion of user selected content, the system further comprising: program instructions to share the first portion of the displayed user selected content as obfuscated content along with the second portion of the displayed user selected content which is visible to a user viewing the shared content.

* * * * *